United States Patent
Kawasaki et al.

(10) Patent No.: US 11,243,187 B2
(45) Date of Patent: Feb. 8, 2022

(54) ELECTROPHORETIC MEDIUM CONTAINER

(71) Applicant: Hitachi High-Technologies Corporation, Tokyo (JP)

(72) Inventors: Naomichi Kawasaki, Tokyo (JP); Ryusuke Kimura, Tokyo (JP); Katsuhiro Aritome, Tokyo (JP); Go Nakajima, Tokyo (JP); Takashi Gomi, Tokyo (JP); Motohiro Yamazaki, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 167 days.

(21) Appl. No.: 16/620,961

(22) PCT Filed: Jun. 28, 2017

(86) PCT No.: PCT/JP2017/023686
§ 371 (c)(1),
(2) Date: Dec. 10, 2019

(87) PCT Pub. No.: WO2019/003330
PCT Pub. Date: Jan. 3, 2019

(65) Prior Publication Data
US 2020/0200705 A1    Jun. 25, 2020

(51) Int. Cl.
*G01N 27/447* (2006.01)
(52) U.S. Cl.
CPC .............. *G01N 27/44704* (2013.01)
(58) Field of Classification Search
CPC ............... G01N 27/44704; B01L 2200/0689
See application file for complete search history.

(56) References Cited

U.S. PATENT DOCUMENTS

| 5,792,107 A * | 8/1998 | Petrocelli ............. A61M 5/3234 |
| | | 604/110 |
| 8,960,685 B2 * | 2/2015 | Maeda ....................... F16J 15/02 |
| | | 277/648 |

(Continued)

FOREIGN PATENT DOCUMENTS

| JP | 2000-9690 A | 1/2000 |
| JP | 2012-120585 A | 6/2012 |

(Continued)

OTHER PUBLICATIONS

JP 2012/120585 machine translation (Year: 2012).*

(Continued)

*Primary Examiner* — Luan V Van
*Assistant Examiner* — Caitlyn Mingyun Sun
(74) *Attorney, Agent, or Firm* — Crowell & Moring LLP

(57) ABSTRACT

The present invention addresses the problem of providing an electrophoretic medium container capable of stabilizing a liquid delivery pressure while ensuring sealing of an electrophoretic medium. In order to resolve this problem, this electrophoretic medium container is provided with a syringe part for holding an electrophoretic medium, and a sealing component for sealing one end of the syringe part, the electrophoretic medium container being characterized in that the sealing component has a sealing surface, a body part, and a groove provided between the sealing surface and the body part, wherein the sealing surface is in contact with the inner wall of the syringe part.

14 Claims, 16 Drawing Sheets

(56) References Cited

U.S. PATENT DOCUMENTS

2014/0309591 A1* 10/2014 Holmqvist .............. A61M 5/24
            604/154
2018/0059055 A1   3/2018 Kimura et al.

FOREIGN PATENT DOCUMENTS

| JP | 2013-140181 A | 7/2013 |
| JP | 2014-47828 A | 3/2014 |
| WO | WO 2009/158613 A1 | 12/2009 |
| WO | WO 2012/118194 A1 | 9/2012 |
| WO | WO 2016/157272 A1 | 10/2016 |

OTHER PUBLICATIONS

Coefficient of Thermal Expansion (Year: 2017).*
International Search Report (PCT/ISA/210) issued in PCT Application No. PCT/JP2017/023686 dated Oct. 24, 2017 with English translation (five (5) pages).
Japanese-language Written Opinion (PCT/ISA/237) issued in PCT Application No. PCT/JP2017/023686 dated Oct. 24, 2017 (three (3) pages).
Japanese-language International Preliminary Report on Patentability (PCT/IPEA/409) issued in PCT Application No. PCT/JP2017/023686 dated May 22, 2018 (seven (7) pages).

* cited by examiner

FIG. 9A
FIG. 9B
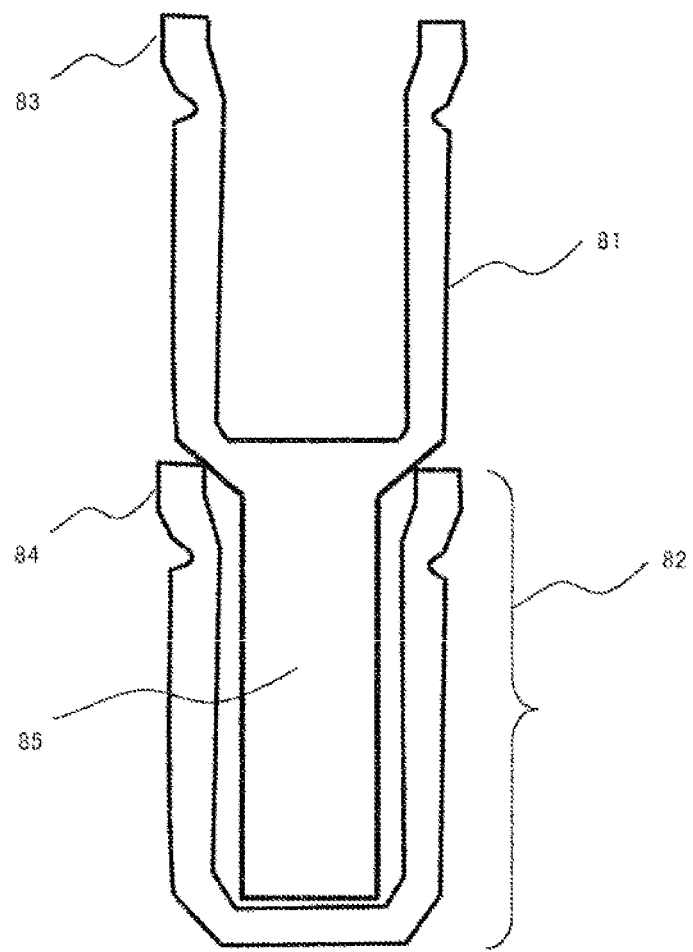
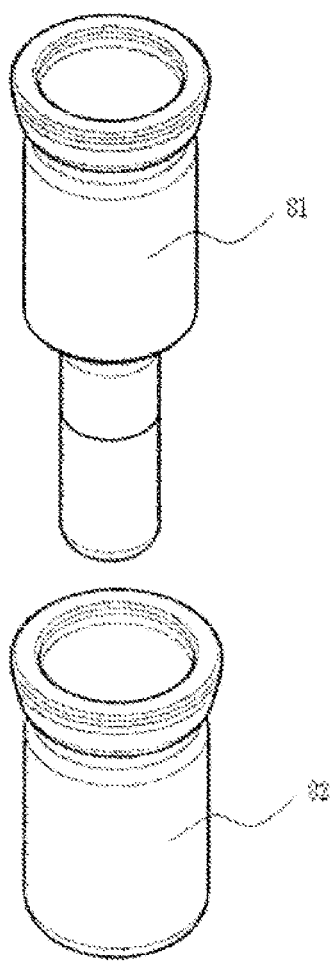

ELECTROPHORETIC MEDIUM CONTAINER

TECHNICAL FIELD

The present invention relates to an electrophoretic medium container suitable for use in an electrophoretic device for separating and analyzing nucleic acids, proteins, and the like.

BACKGROUND ART

In recent years, a capillary electrophoretic device has been widely used as an electrophoretic device in which a capillary is filled with an electrophoretic medium such as a polymer gel or a polymer solution.

PTL 1 discloses that "liquid delivery of an electrophoretic medium is performed by pressing a sealing component of an electrophoretic medium container from the outside". In PTL 1, cost reduction is achieved by using the electrophoretic medium container as a resin molded product. Further, by creating a structure in which deformation is prevented on a device side in which the electrophoretic medium container is set instead of increasing the rigidity of the electrophoretic medium container, it is possible to achieve a high pressure resistance even in an inexpensive electrophoretic medium container. Further, the structure has a function of detecting a remaining amount in the electrophoretic medium container on the device side and removing the internal pressure in the electrophoretic medium container after liquid delivery. As a result, it is possible to manage the remaining amount and the liquid delivery amount in the electrophoretic medium container.

CITATION LIST

Patent Literature

PTL1: WO2016/157272

SUMMARY OF INVENTION

Technical Problem

When the electrophoretic medium is liquid delivered to the capillary, the sealing component slides along an inner wall of a container syringe part. At this time, due to expansion of the sealing component due to the internal pressure, a contact area of the inner wall and the sealing component changes and generated sliding resistance changes. As a result, liquid delivery pressure may be not stable during the liquid delivery. When the liquid delivery pressure is not stable, it is difficult to manage the liquid delivery amount with a fine resolution as in the related art, and variation occurs in the liquid delivery amount for determining that the electrophoretic medium is filled in the capillary. In particular, when an electrophoretic medium amount for filling varies in an increasing direction, a running cost cannot be reduced. Similarly, when the electrophoretic medium leaks from a gap between the inner wall of the syringe part and the sealing component to the outside of the container, the liquid delivery amount varies. PTL 1 did not study the above problems.

In order to solve the above problems, it is necessary to stabilize the seal sliding resistance in the electrophoretic medium liquid delivery, to stabilize the liquid delivery pressure, and to liquid deliver the electrophoretic medium without leaking to the outside of the container. Therefore, an object of the invention is to provide an electrophoretic medium container capable of stabilizing the liquid delivery pressure while ensuring a sealing property of the electrophoretic medium.

Solution to Problem

In order to solve the above problems, an electrophoretic medium container of the invention includes a syringe part that holds an electrophoretic medium, a sealing component that seals one end of the syringe part. The sealing component includes a sealing surface, a body part, and a groove provided between the sealing surface and the body part, in which the sealing surface is in contact with an inner wall of the syringe part.

Advantageous Effect

According to the invention, the sealing surface is closely adhered to the inner wall of the container syringe part and the sealing property can be ensured.

BRIEF DESCRIPTION OF DRAWINGS

FIG. 9A is a cross-sectional view when sealing components are connected.

FIG. 9B is a perspective view of a connectable sealing component.

DESCRIPTION OF EMBODIMENTS

Embodiments of the invention will be described below with reference to the drawings.

First Embodiment

Figure 1:
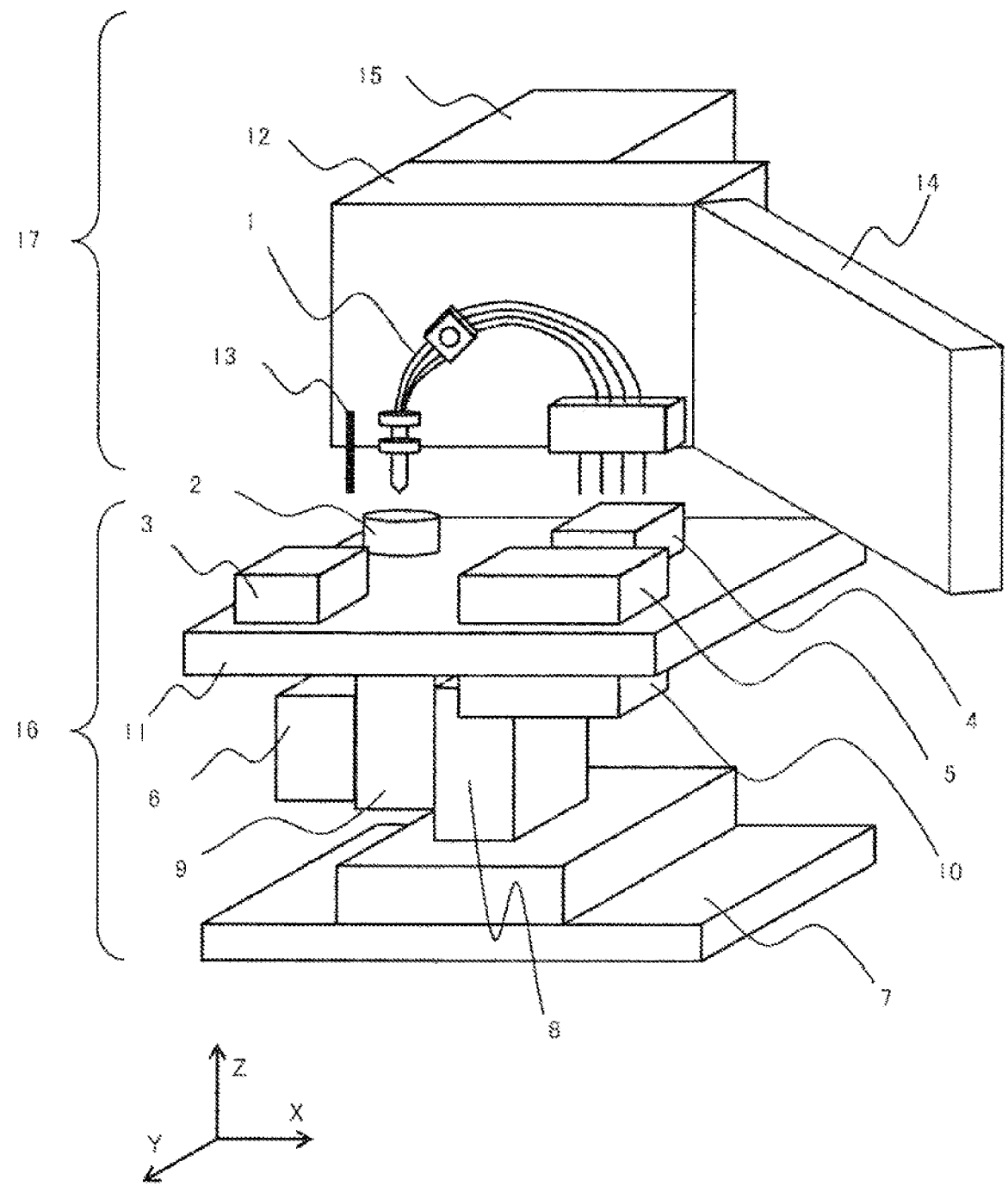
FIG. 1 is a schematic view of a configuration of a device according to the invention.

FIG. 1 is a view showing a configuration of a capillary electrophoretic device to which the invention is applied. The device can be broadly divided into two units of an autosampler unit 16 at a lower part of the device and an irradiation detection/thermostatic chamber unit 17 at an upper part of the device.

The auto sampler unit 16 includes a Y-axis driver 8 mounted on a sampler base 7, a Z-axis driver 9 mounted on the Y-axis driver 8, and a sample tray 11 mounted on the Z-axis drive body 9. The sample tray 11 can be driven in the Y-axis and the Z-axis. A user sets an electrophoretic medium container 2, an anode-side buffer solution container 3, a cathode-side buffer solution container 4, and a sample container 5 on the sample tray 11. The sample container 5 is set on an X-axis driver 10 mounted on the sample tray 11, and only the sample container 5 can be driven in the X-axis on the sample tray 11. A liquid delivery mechanism 6 is also mounted on the Z-axis drive body 9. The liquid delivery mechanism 6 is disposed below the electrophoretic medium container 2.

The irradiation detection/thermostatic chamber unit 17 includes a thermostatic chamber unit 12 and a thermostatic chamber door 14 and the inside can be maintained at a constant temperature. An irradiation detection unit 15 is mounted behind the thermostatic chamber unit 12 and can perform detection during electrophoresis. The user sets a capillary array 1 in the thermostatic chamber unit 12, performs electrophoresis while keeping the temperature of the capillary array 1 constant in the thermostatic chamber unit 12, and performs detection by the irradiation detection unit 15. Further, an electrode 13 to be dropped to GND when a high voltage for electrophoresis is applied is also mounted in the thermostatic chamber unit 12.

As described above, the capillary array 1 is fixed to the thermostatic chamber unit 12. The electrophoretic medium container 2, the anode-side buffer solution container 3, the cathode-side buffer solution container 4, and the sample container 5 can be driven in the YZ-axis by the autosampler unit 16, and only the sample container 5 can be driven in the X-axis. In the fixed capillary array 1, the electrophoretic medium container 2, the anode-side buffer solution container 3, the cathode-side buffer solution container 4, and the sample container 5 can be automatically connected to an arbitrary position by a movement of the autosampler unit 16.

Figure 2:
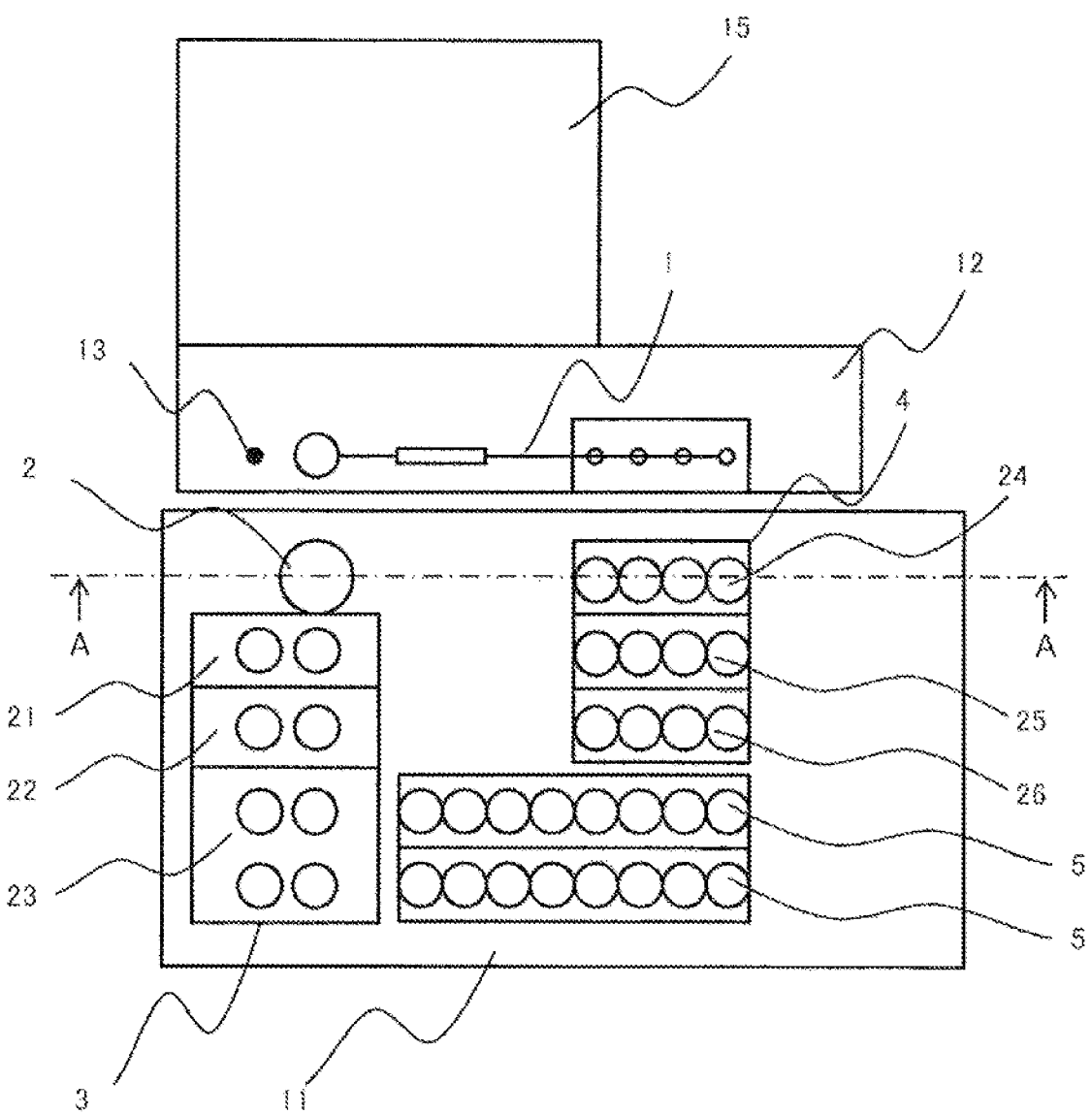
FIG. 2 is a top view of the device according to the invention.

FIG. 2 is a view showing the capillary electrophoretic device as viewed from above. The anode-side buffer solution container 3 set on the sample tray 11 includes an anode-side cleaning tank 21, an anode-side electrophoretic buffer solution tank 22, and a sample introduction buffer solution tank 23. Further, the cathode-side buffer liquid container 4 includes a waste liquid tank 24, a cathode-side cleaning tank 25, and a cathode-side electrophoretic buffer solution tank 26. The electrophoretic medium container 2, the anode-side buffer solution container 3, the cathode-side buffer solution container 4, and the sample container 5 are disposed in a positional relationship as shown in the figure. That is, a positional relationship on the anode side and the cathode side at the time of connection with the capillary array 1 is "electrophoretic medium container 2 and liquid waste tank 24", "anode-side cleaning tank 21 and cathode-side cleaning tank 25", "anode-side electrophoretic buffer solution tank 22 and cathode-side electrophoretic buffer solution tank 26", and "sample introduction buffer solution tank 23 and sample container 5".

Figure 3:
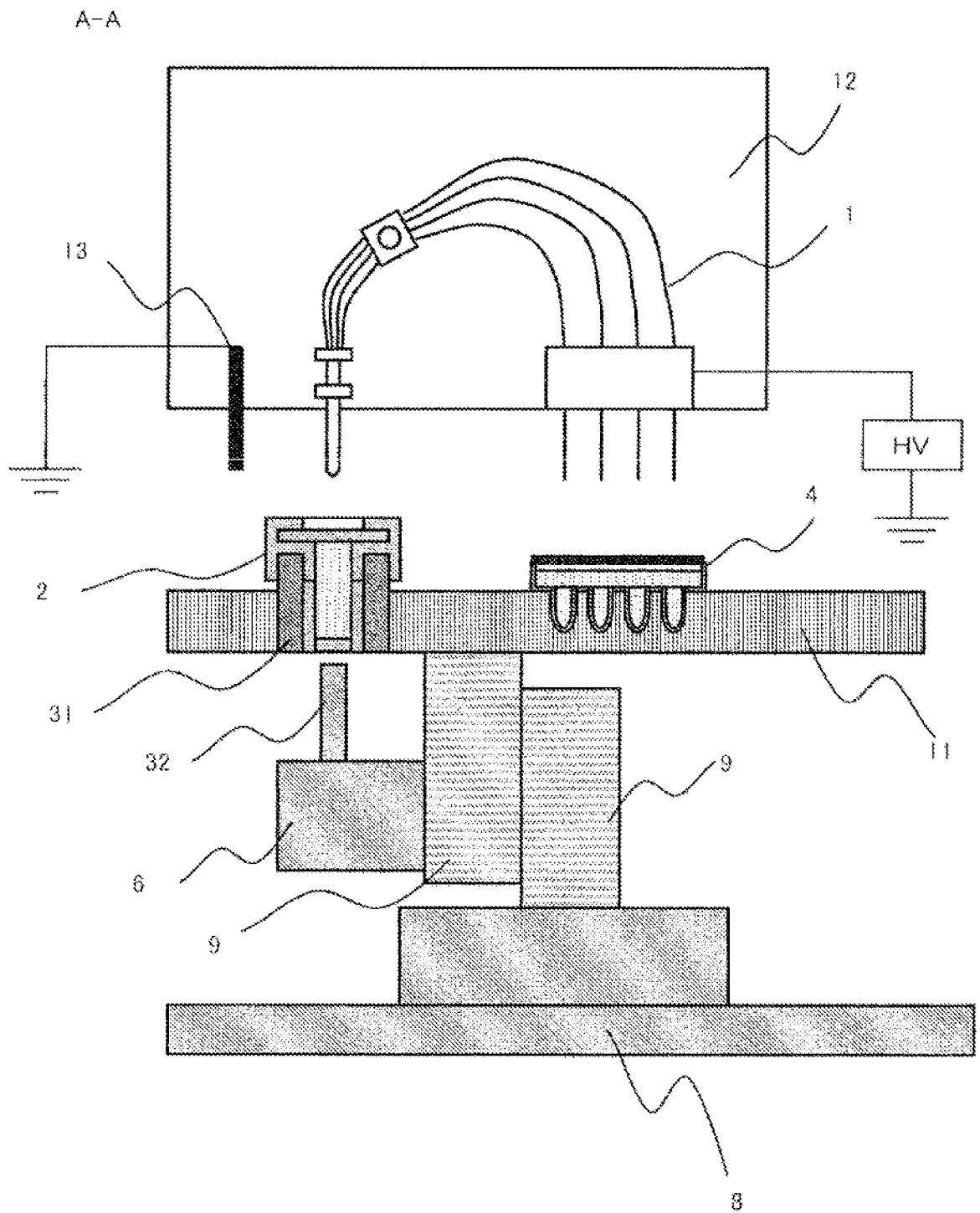
FIG. 3 is an A-A cross-sectional view of the device.

FIG. 3 is a cross-sectional view taken along a line A-A in FIG. 2. The electrophoretic medium container 2 is inserted into a guide 31 embedded in the sample tray 11. The liquid delivery mechanism 6 is disposed such that a plunger 32 provided in the liquid delivery mechanism 6 is located below the electrophoretic medium container 2.

During the electrophoresis, the right side of the capillary array 1 in FIG. 3 is the cathode side and the left side thereof is the anode side. The autosampler unit 16 is moved to the position of the "anode-side electrophoretic buffer solution tank 22 and the cathode-side electrophoretic buffer solution tank 26", and a high voltage is applied to the capillary array 1 on the cathode side and flows through the cathode-side buffer solution container 4 and the anode-side buffer solution container 3 to GND at the electrode 13, thereby performing the electrophoresis.

Figure 4:
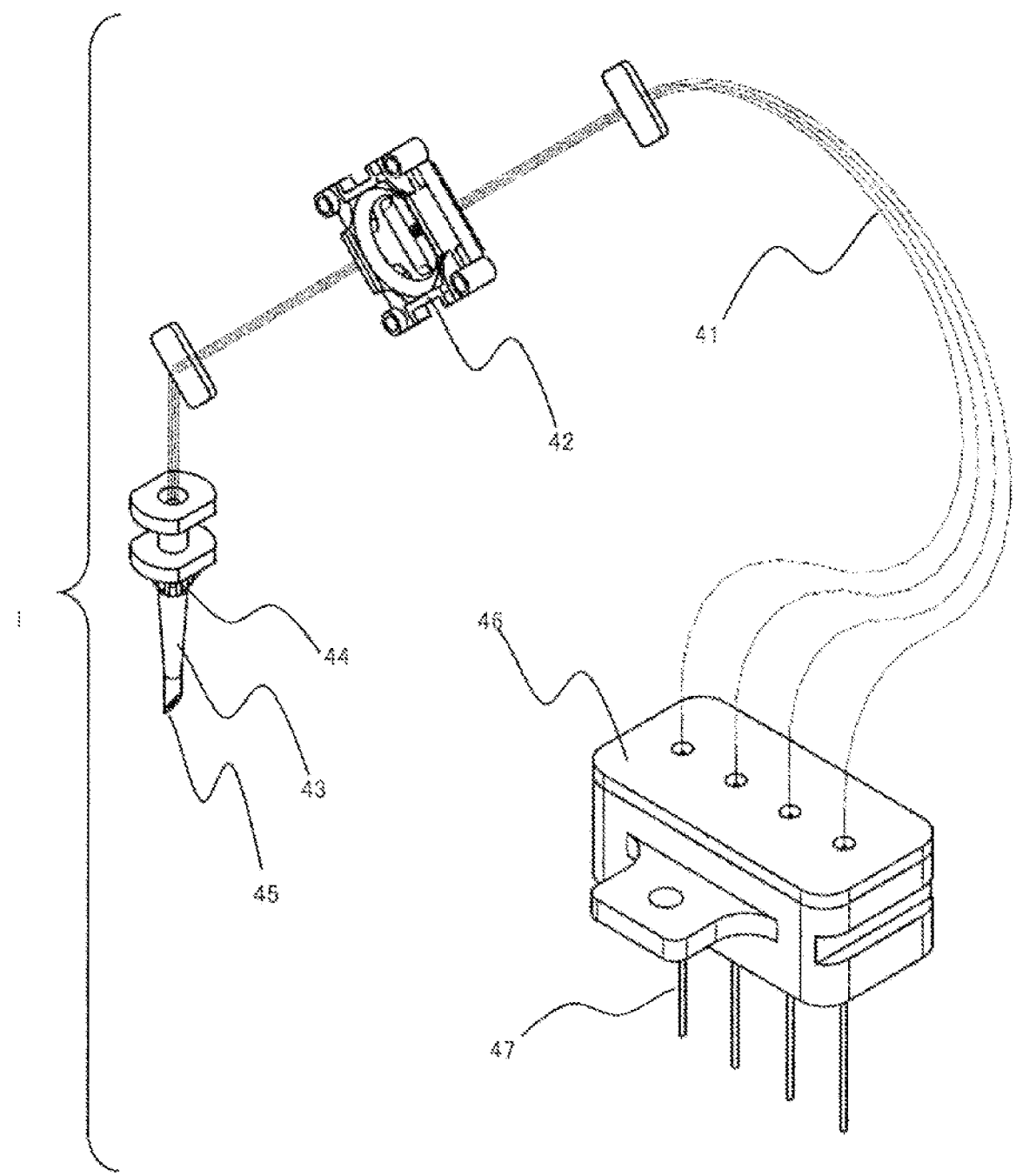
FIG. 4 is a detailed view of a capillary array.

FIG. 4 is a detailed view of the capillary array 1. The capillary array 1 includes capillaries 41 which are glass tubes having an inner diameter of about 50 µm and a detection unit 42 attached to the capillaries 41. The detection unit 42 is detected by the irradiation detection unit 15. A load header 46 and SUS pipes 47 are attached to a cathode-side end portion of the capillaries 41. The material of the load header 46 is desirable to be, for example, a PBT resin which is a resin having a high insulation property and a high comparative tracking index. A component for conducting all of the SUS pipes 47 is provided inside the load header 46 and a high voltage is applied to all of the SUS pipes 47 by applying the high voltage thereto. The capillaries 41 separately pass through the SUS pipes 47 and are fixed. On the anode side, a plurality of capillaries 41 are combined into one by a capillary head 43. The capillary head 43 includes a capillary head tip 45 having a needle shape at an acute angle and a capillary head boss 44 having an outer diameter larger than the capillary head tip 45. The material of the capillary head 43 is unlikely to be chipped and has rigidity, which is preferably a PEEK resin or the like which is a resin having high stability to chemicals and analysis.

Although not illustrated, when the capillary array 1 is fixed to the thermostatic chamber unit 12, the detection unit 42, the load header 46, and the capillary head 43 are fixed, separately. The detection unit 42 performs positioning with high accuracy so as to be a position that can be detected by the irradiation detection unit. The load header 46 is fixed to be electrically connected to a location to which a high voltage is applied. The capillary head 43 is firmly fixed such that the capillary head tip 45 is directed straight downward to withstand the load. The positional relationship of the cathode side and the anode side during fixing is disposed such that the plurality of capillaries 41 do not overlap each other when set in the device.

Figure 5:
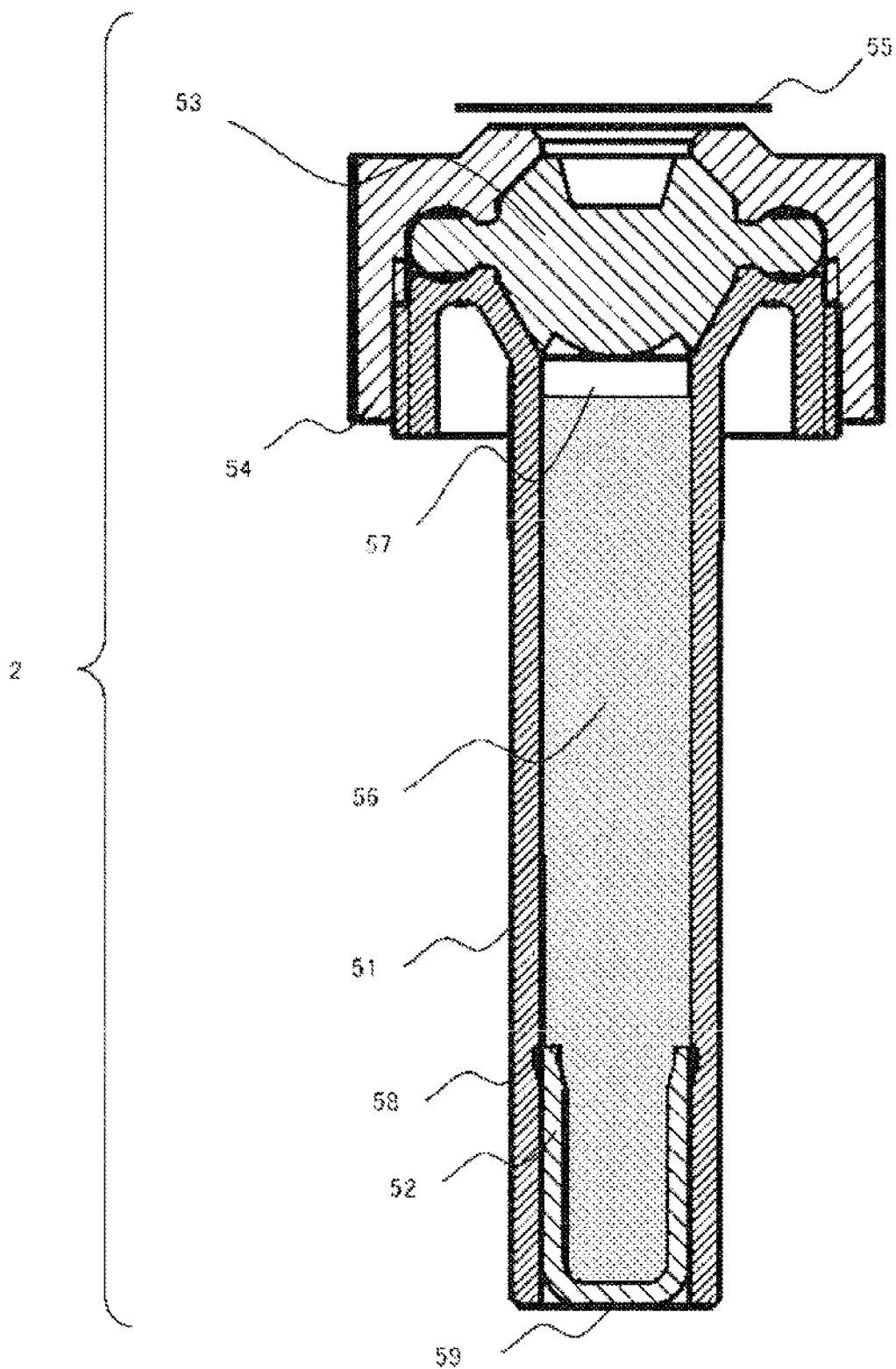
FIG. 5 is a detailed view of an electrophoretic medium container.

FIG. 5 is a configuration view of the electrophoretic medium container 2. The electrophoretic medium container 2 includes a syringe part 51. A sealing component 52 is inserted from an uppermost part (an upper side in the drawing) of the syringe part 51 and moved to a lowermost part of the syringe part 51. A rubber plug 53 is placed on the uppermost part of the syringe part 51, and a cap 54 is wound and sealed. A film 55 is further adhered and sealed on the cap 54. Although the inside of the electrophoretic medium container 2 is filled with the electrophoretic medium 56, air 57 that enters at this time is accumulated in an upper part of the syringe part 51. The material of the electrophoretic medium container 2 is preferably a COP resin which is a resin that can be thin-molded and has little influence on the material property due to temperature changes.

Figure 6A:
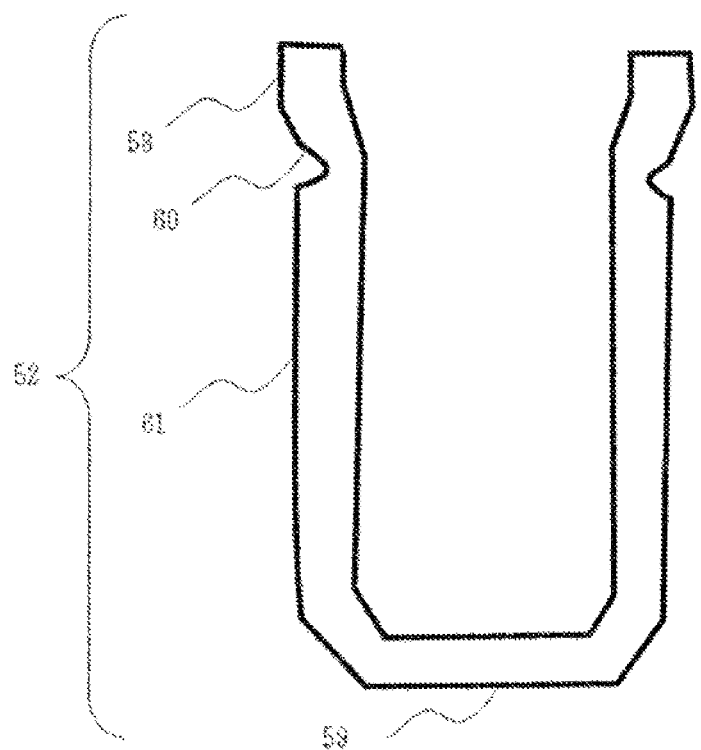
FIG. 6A is a cross-sectional view of a sealing component.
Figure 6B:
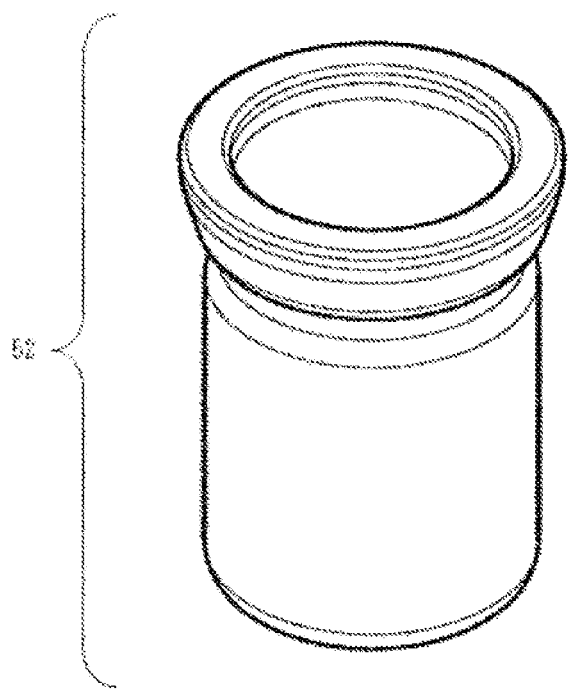
FIG. 6B is a perspective view of the sealing component.
Figure 15A:
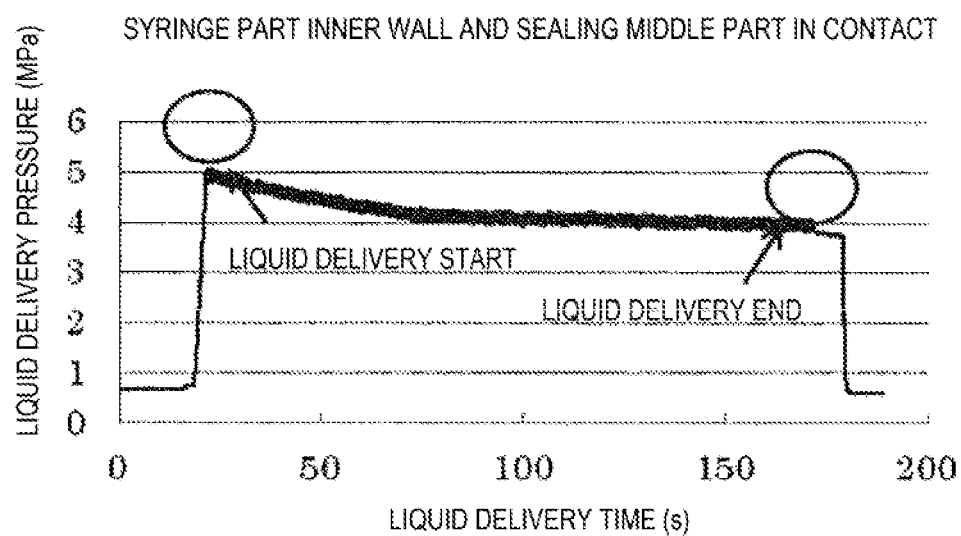
FIG. 15A is a graph of generated pressure during polymer liquid delivery.
Figure 15B:
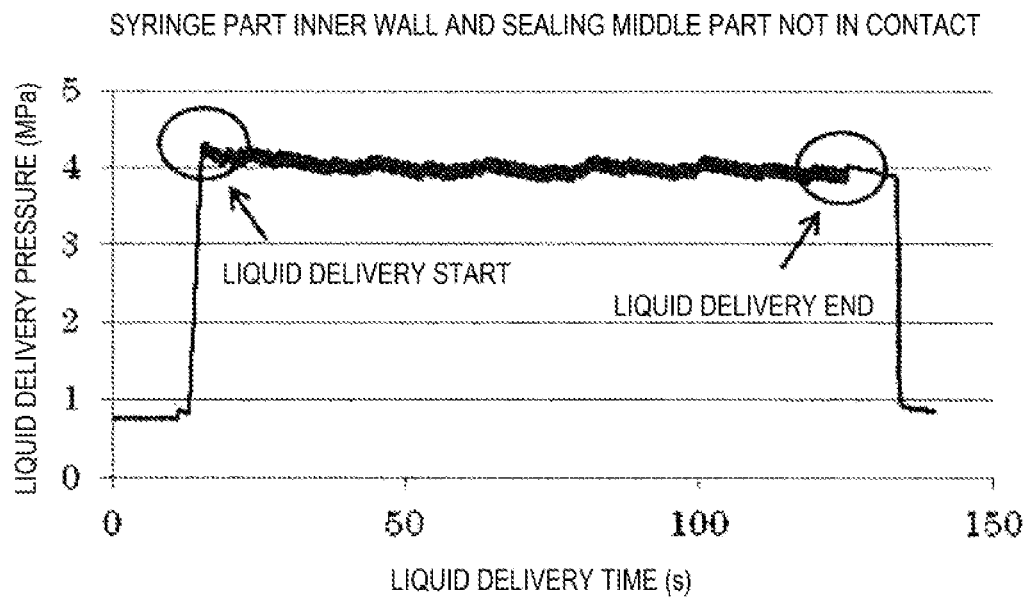
FIG. 15B is a graph of the generated pressure during polymer liquid delivery.

FIG. 6(a) is a configuration view of the sealing component 52 to be inserted into the syringe part 51. The sealing component 52 slides in the syringe part 51 when the electrophoretic medium 56 is liquid delivered. As shown in FIG. 6(b), the sealing component 52 has a cylindrical shape with a bottom 59 and has a U-shaped cross section facing the inside of the electrophoretic medium container 2. Since the bottom 59 is provided, the electrophoretic medium 56 is sealed inside the electrophoretic medium container 2. The outer diameter of a sealing surface 58 of the sealing component 52 is slightly larger than the inner diameter of the syringe part 51. Therefore, when inserted, the sealing surface 58 is crushed and is closely adhered to the inner wall of the syringe part 51. Since the sealing component 52 has a U-shaped cross section and has a structure with the sealing surface 58 at the uppermost portion, the sealing surface 58 spreads outward and seals the syringe part 51 when an internal pressure of the electrophoretic medium container 2 is increased. The sealing surface 58 may be a flat surface or a curved surface. A body part 61 has a diameter smaller than the outer diameter of the sealing surface 58 and has an outer diameter that does not come into contact with the inner wall of the syringe part 51 even when expanding outward when the internal pressure of the electrophoretic medium container 2 is increased. Thus, only the sealing surface 58 comes into contact with the inner wall of the syringe part 51. In this way, by limiting a portion in contact with the inner wall of the syringe part 51 to the sealing surface 58 and by reducing the variation in a contact area between the inner wall of the syringe part 51 and the sealing component 52, changes in sliding resistance during liquid delivery can be prevented and the pressure during liquid delivery can be stabilized. However, when the contact area between the sealing component 52 and the inner wall of the syringe part 51 is reduced, the sealing property is reduced and a risk of leakage of the electrophoretic medium 56 is increased. Therefore, a groove 60 is provided between the sealing surface 58 and the body part 61. By providing the groove 60, when the internal pressure of the electrophoretic medium container 2 is increased, the sealing surface 58 is more likely to spread outward, so that the sealing surface 58 and the inner wall of the syringe part 51 can be further closely adhered and the sealing property is improved. The groove 60 may have a structure in which a thickness of the sealing component 52 is smaller than that of the sealing surface 58 or the body part 61, and may be provided inside the sealing component 58. FIGS. 15(*a*) and 15(*b*) show measurement results of the liquid delivery pressure. FIG. 15(*a*) shows a case where the body part 61 is in contact with the inner wall of the syringe part 51 and FIG. 15(*b*) shows a case where the body part 61 is not in contact with the inner wall of the syringe part 51. In the case of FIG. 15(*a*) where the body part 61 is in contact with the inner wall of the syringe part 51, the liquid delivery pressure is changed from 5 MPa to 4 MPa. In the case of FIG. 15 (*b*) where the body part 61 is not in contact with the inner wall of the syringe part 51, it can be seen that the liquid delivery is stable at 4 MPa from the start to the end.

Figure 16:
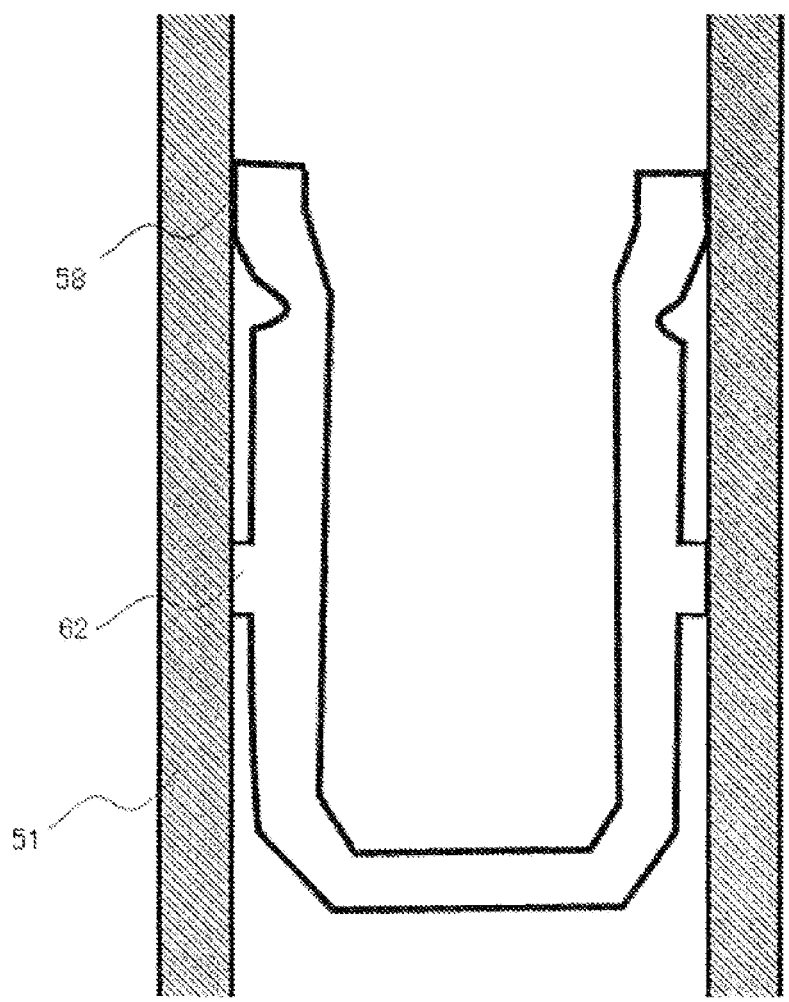
FIG. 16 is a cross-sectional view of sealing components provided at a plurality of locations on a sealing surface.

Although the sealing surface 58 is provided on the upper portion of the sealing component 52, as shown in FIG. 16, a body part sealing surface 62 may be provided at a plurality of locations of the sealing component 52. As a result, it is possible to further prevent the electrophoretic medium 56 from leaking. The material of the sealing component 52 is preferably an ultra-high molecular PE resin that has a track record of being used for fluid sealing of a sliding portion and the like and an expansion coefficient higher than the material of the syringe part 51, and easily spreads outward when the internal pressure of the electrophoretic medium container 2 increases, and may also be a rubber material.

Figure 10:
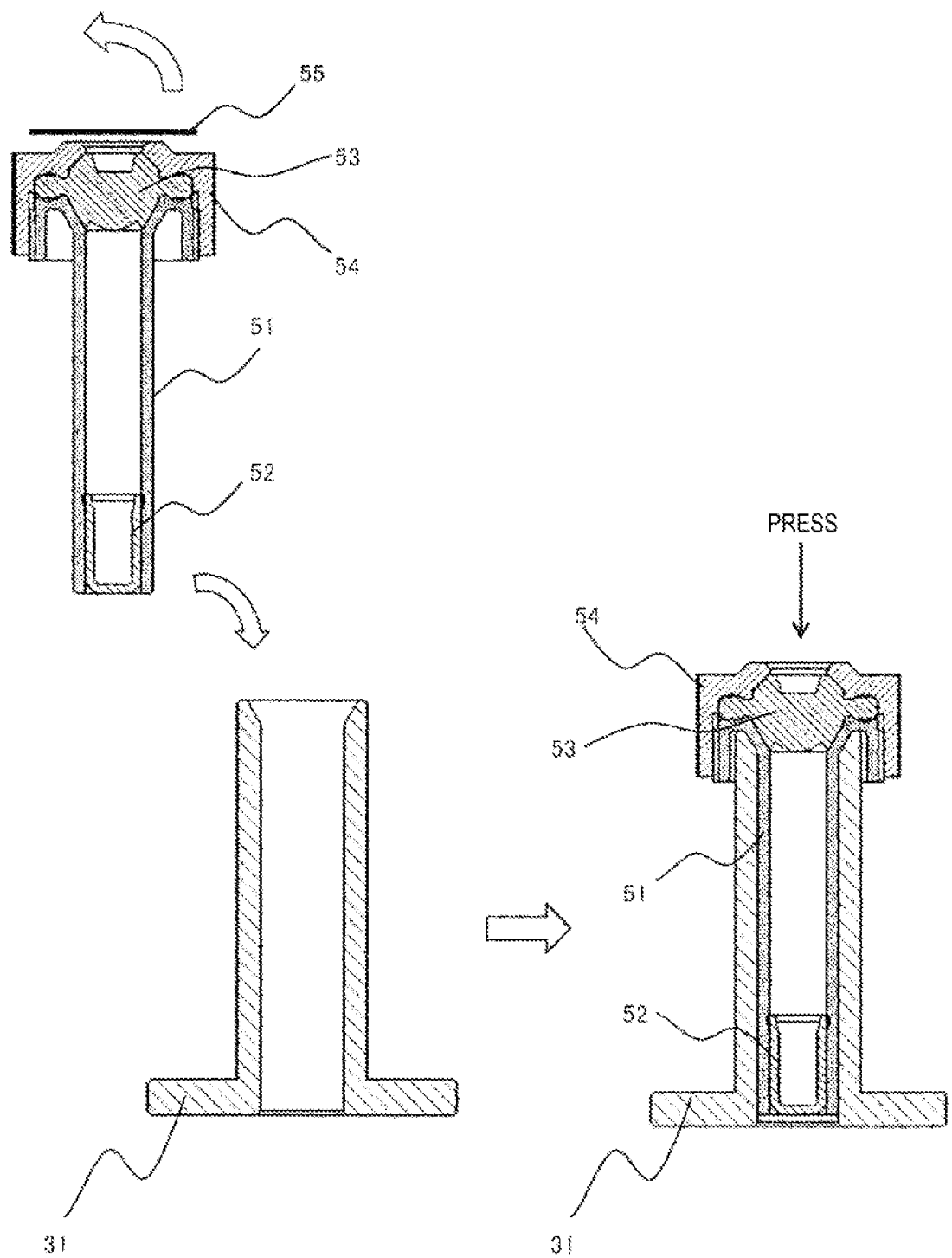
FIG. 10 is a detailed view of mounting of the electrophoretic medium container.

FIG. 10 is a detailed view showing device mounting of the electrophoretic medium container 2. When the electrophoretic medium container 2 is set in the device, first, the film 55 attached to the cap 54 is peeled off. Thereafter, the electrophoretic medium container 2 is set on the guide 31 embedded in the sample tray 11 and is fixed from the top so as not to float up. The guide 31 has a high rigidity and plays a role of preventing deformation of the electrophoretic medium container 2 until it comes into contact with the guide 31. When the electrophoretic medium container 2 is set on the guide 31, a gap between the outer diameter of the syringe part 51 and the inner diameter of the guide 31 is reduced as much as possible. Although it is better to reduce the gap as much as possible, the gap between the outer diameter of the syringe part 51 of a resin molded article and the inner diameter of the guide 31 which is a machined product is set reasonable for processing.

Figure 11:
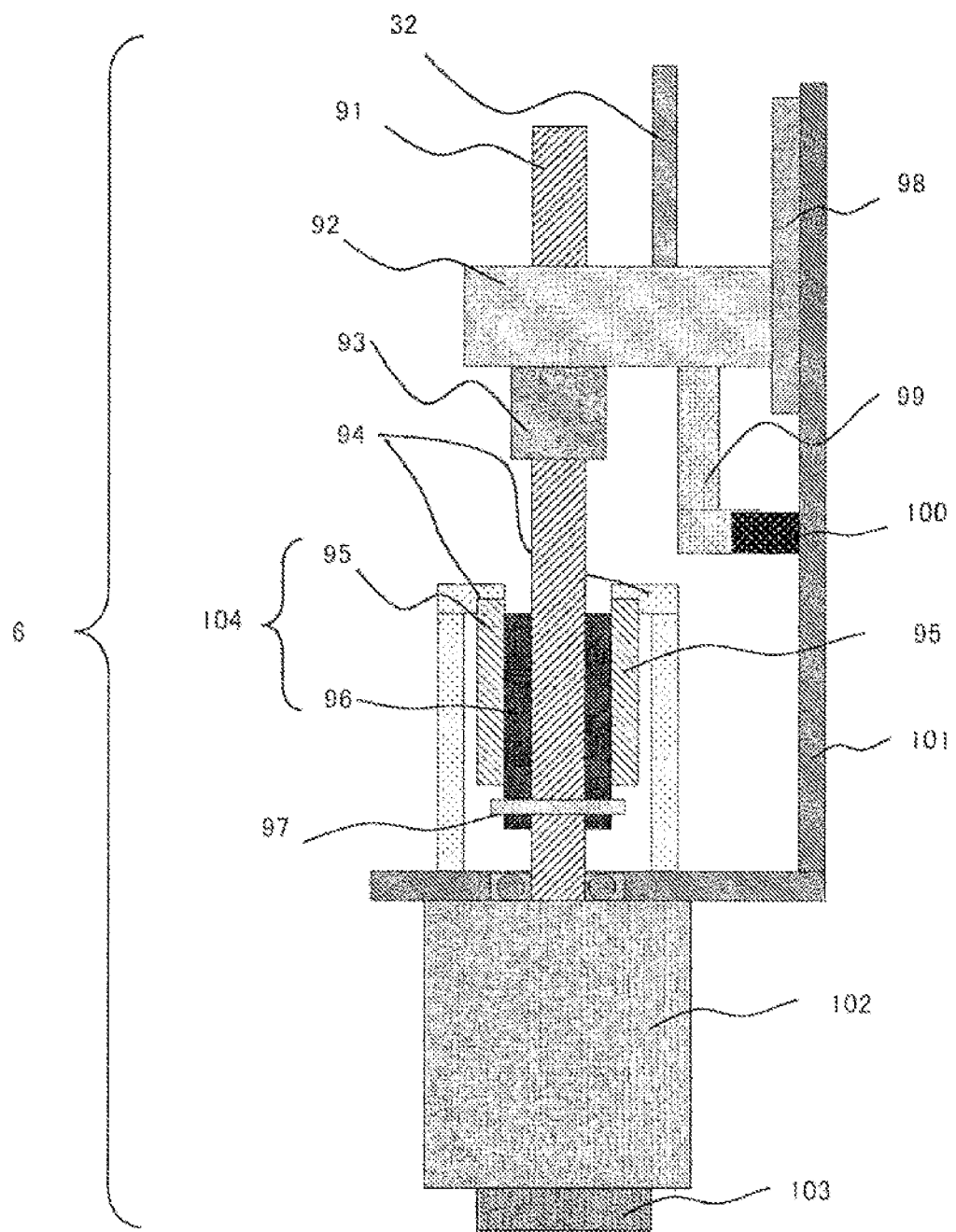
FIG. 11 is a liquid delivery mechanism.

FIG. 11 is a schematic view showing the liquid delivery mechanism 6. A stepping motor 102 rotates in accordance with the number of input pulses, rotates a driving screw 91, and causes a nut 93 to move straight. A method of driving the stepping motor 102 is, for example, 1-2 phase excitation. The nut 93 is coupled to a slider 92 and the slider 92 is coupled to the plunger 32. A position control of the plunger 32 is performed by a rotary encoder 103 integrated with the stepping motor 102. The slider 92 is connected to a linear guide 98 and is movable in an axial direction of the driving screw 91. A detection plate 99 is coupled to the slider 92 and is detected by an origin sensor 100 fixed to a liquid delivery mechanism base 101. A detection position of the origin sensor 100 is an origin position of the plunger 32.

A torque limiter 104 is attached to the driving screw 91 as an external load that provides rotation resistance. The torque limiter 104 has a structure in which an inner ring 96 and an outer ring 95 are coaxially fitted. The inner ring 96 of the torque limiter 104 has a hollow structure. The inner ring 96 and the outer ring 95 are independently rotatable. A constant rotation resistance is provided between the inner ring 96 and the outer ring 95. As a method of providing the rotation resistance, a magnet type which is hardly affected by abrasion is desirable. The driving screw 91 passes through the hollow portion of the inner ring 96 and the driving screw 91 is fitted to the inner ring 96 by a parallel pin 97 vertically penetrating the driving screw 91, so that the driving screw 91 and the inner ring 96 rotate synchronously. The outer ring 95 is fixed so as not to rotate by a torque limiter outer ring preventing member 94 fixed to the liquid delivery mechanism base 101. With the above structure, it is possible to apply resistance to the driving screw 91. For example, the torque limiter 104 that requires a torque of 45 mN·m is used when the outer ring 95 is fixed and the inner ring 96 is rotated.

Figure 12:
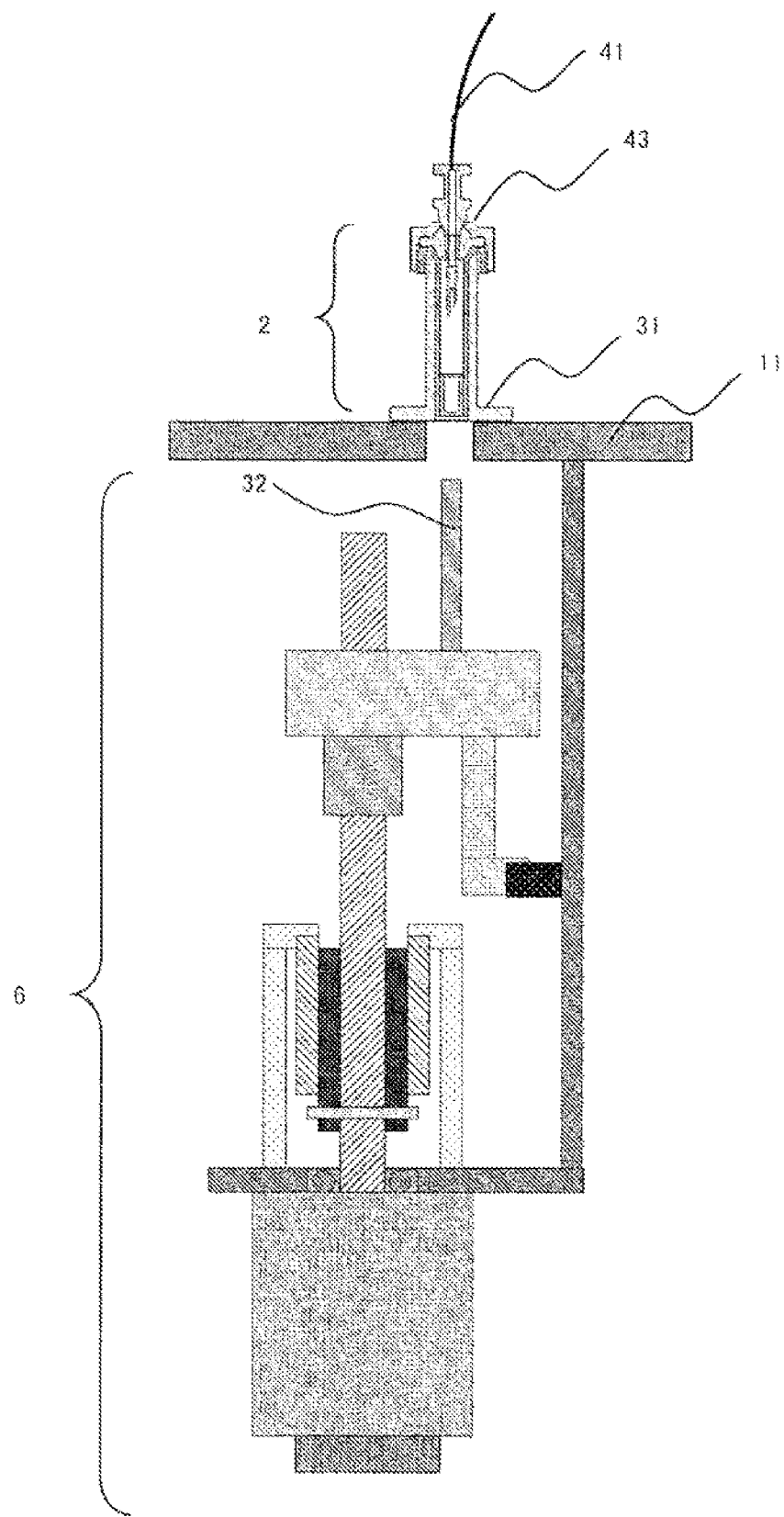
FIG. 12 is a detailed view of electrophoretic medium liquid delivery operation (initial state).
Figure 13:
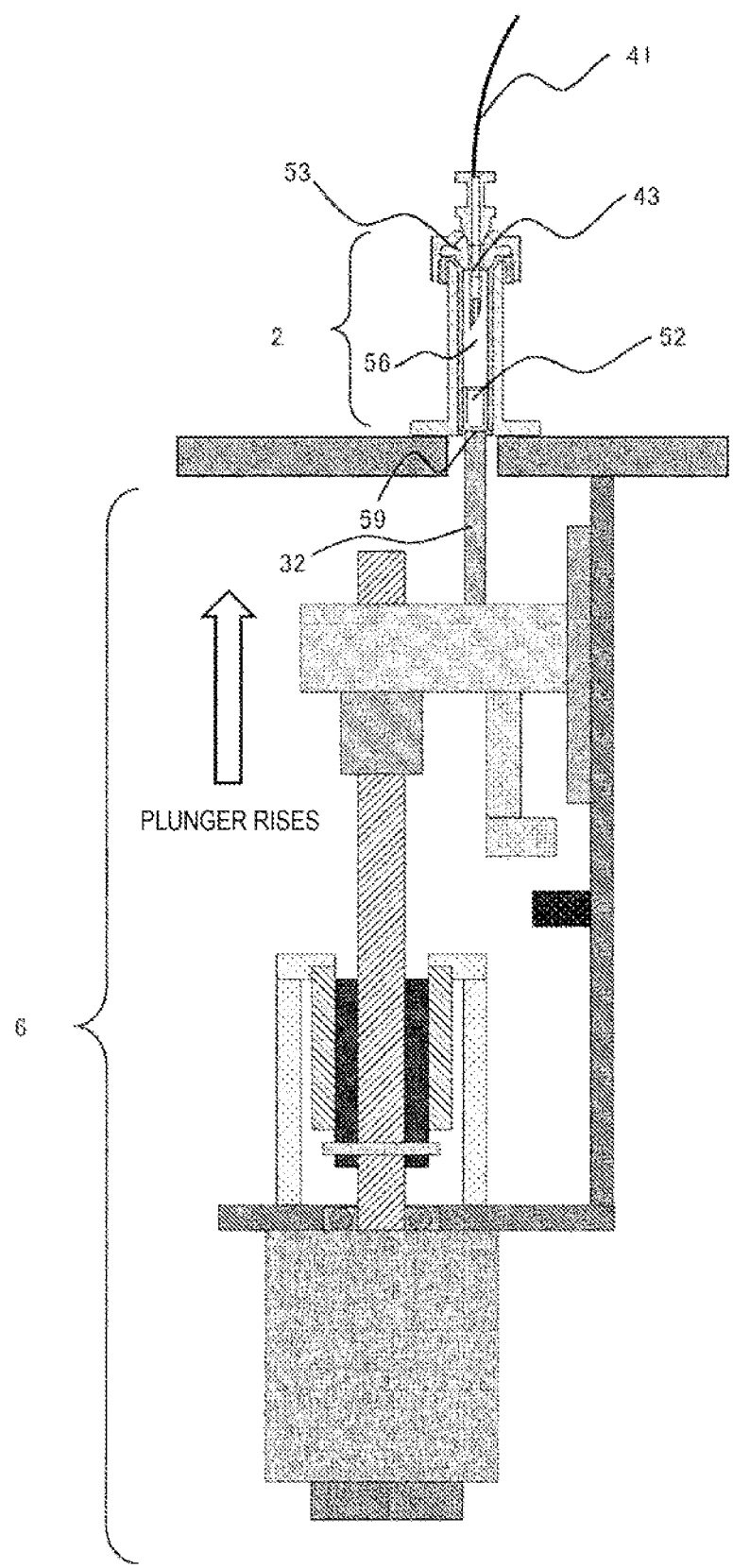
FIG. 13 is a detailed view of the electrophoretic medium liquid delivery operation (plunger contact detection).
Figure 14:
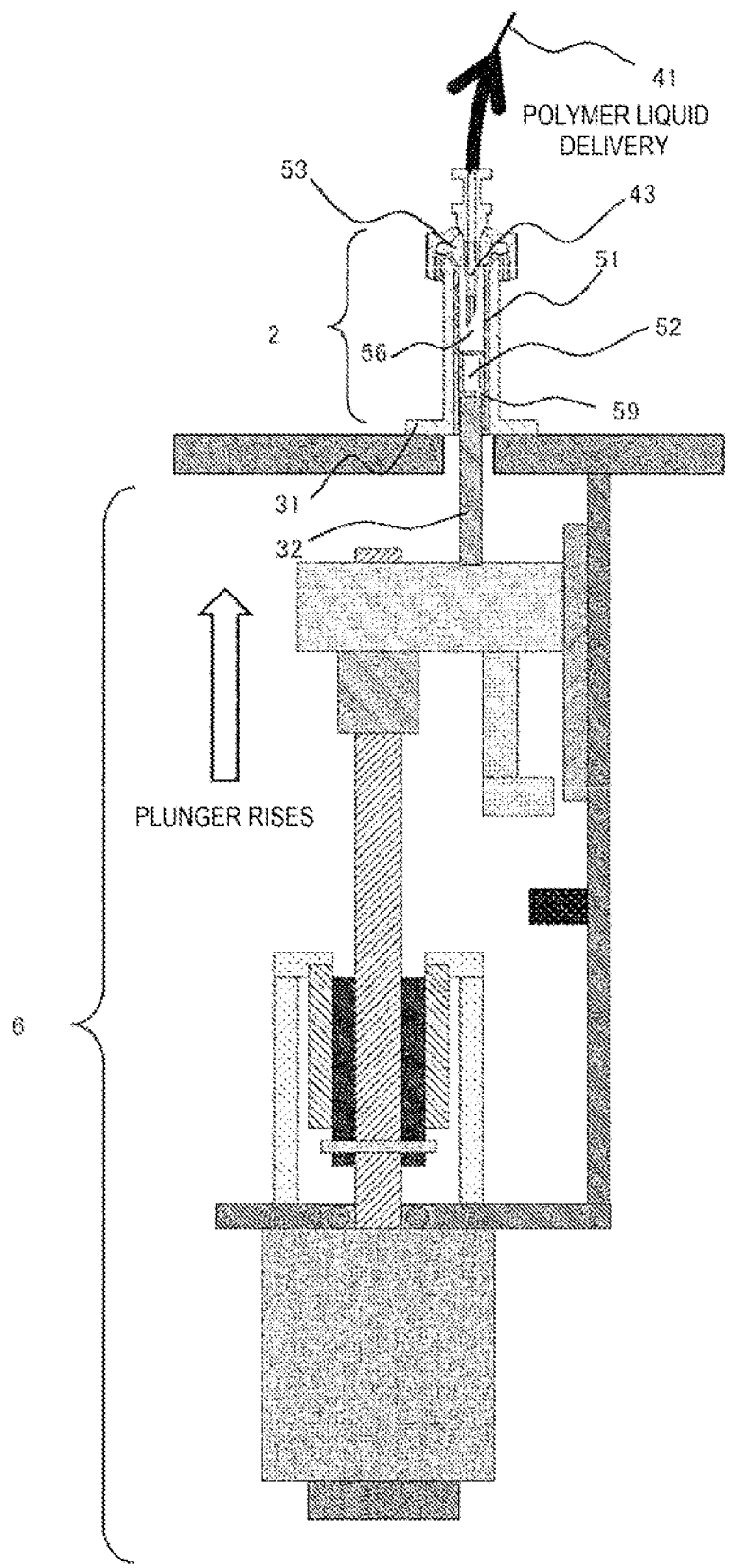
FIG. 14 is a detailed view of the electrophoretic medium liquid delivery operation (electrophoretic medium injection).

Next, a procedure when injecting the electrophoretic medium 56 will be described. The positional relationship between the plunger 32, the electrophoretic medium container 2, and the capillary head 43 at each point is shown in FIGS. 12 to 14. First, as shown in FIG. 12, the electrophoretic medium container 2 is set on the guide 31. The plunger 32 of the liquid delivery mechanism 6 is disposed directly below the electrophoretic medium container 2.

FIG. 13 is a view showing an initial state of a series of movements of the electrophoretic medium 56 injection operation. As described above, the sealing component 52 inserted into the electrophoretic medium container 2 can slide with the movement of the plunger 32. The plunger 32 is driven by the liquid delivery mechanism 6 and is brought into contact with the bottom 59 of the sealing component 52.

FIG. 14 shows a state in which the electrophoretic medium 56 is being filled into the capillary 41. After the plunger 32 is brought into contact with the bottom 59 of the sealing component 52 in FIG. 13, the sealing component 52 is further pushed up to liquid deliver the electrophoretic medium 56 to the capillary 41. At this time, the internal pressure of the electrophoretic medium container 2 is high and each portion of the electrophoretic medium container 2 expands to the outside. As described above, deformation of the syringe part 51 of the electrophoretic medium container 2 is prevented by the guide 31 and deformation of the rubber plug 53 is prevented by the capillary head 43. Further, when the sealing component 52 is deformed by the internal pressure, the sealing component 52 deforms to expand outward and is further sealed. In the electrophoretic medium container 2, with the expansion coefficient of the sealing component 52 being larger than that of the syringe part 51 and the shape and strength of the sealing component 52 being more easily deformed, it is possible to reduce the risk of the leakage of the electrophoretic medium 56 due to the deformation of the syringe part 51.

Second Embodiment

Figure 7A:
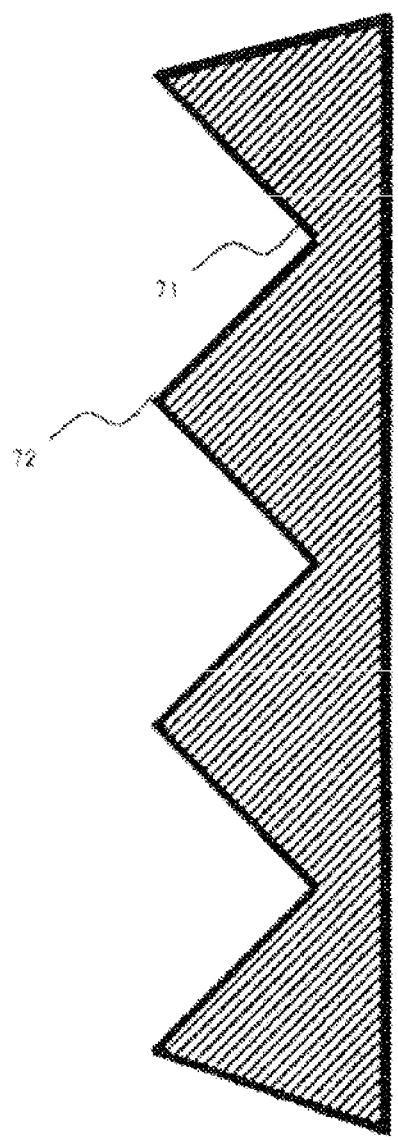
FIG. 7A is an enlarged cross-sectional view of a sealing surface.
Figure 7B:
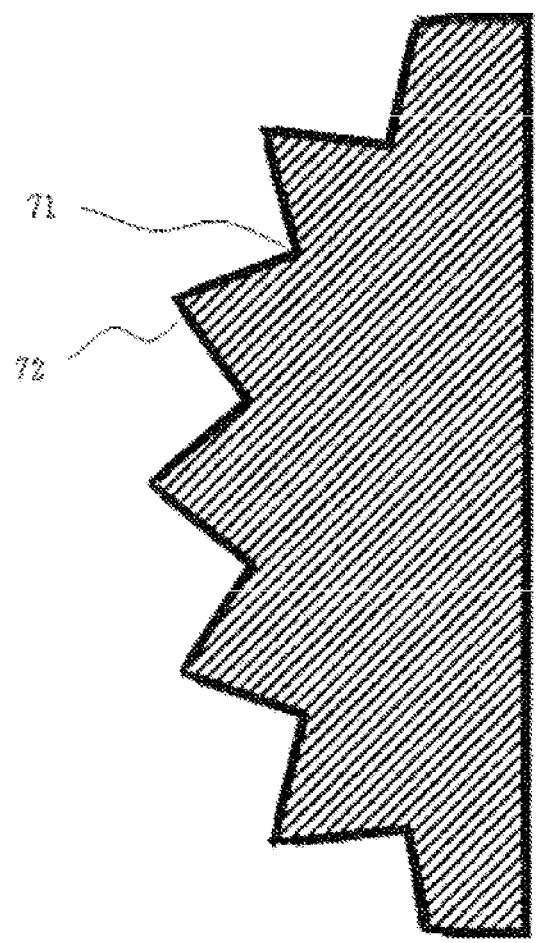
FIG. 7B is an enlarged cross-sectional view of a sealing surface.
Figure 8:
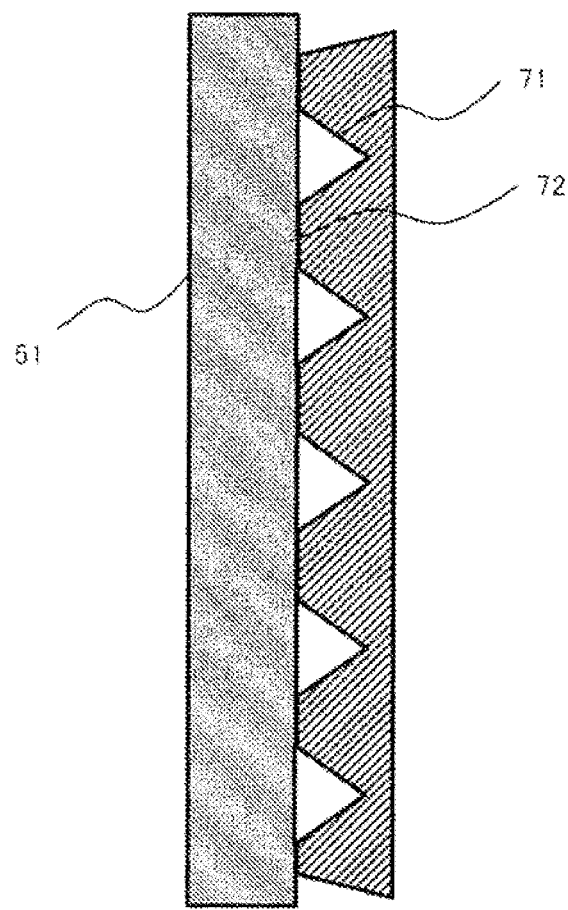
FIG. 8 is a schematic cross-sectional view of a sealing surface when the sealing component is inserted.

A multistage structure may be provided on the sealing surface 58. FIG. 7(a) is a view showing a multistage structure. The sealing surface 58 has a multistage structure of a concave portion 71 and a convex portion 72 along a vertical direction. When the sealing component 52 is inserted into the syringe part 51, the convex portion 72 is crushed and adhered as shown in FIG. 8. Even if the electrophoretic medium 56 enters a space between the sealing surface 58 and the inner wall of the syringe part 51, the leakage pressure can be gradually decreased, so that leakage to the lower side can be prevented. Further, by narrowing the tip of the convex portion 72, the convex portion 72 can be easily crushed by the internal pressure and the convex portion 72 and the syringe part can be further closely adhered. The sealing surface provided with the multistage structure may be a flat surface as shown in FIG. 7(a) or a curved surface as shown in FIG. 7(b).

Third Embodiment

Although the number of the sealing components 52 is one in the first embodiment, a plurality of sealing components 52 may be connected.

A case in which two seal components 52 are connected in the vertical direction will be described with reference to FIGS. 9(a) and 9(b). FIG. 9(a) is a cross-sectional view of a state in which two sealing components 52 (including an upper seal 81 and a lower seal 82) are connected in the vertical direction and FIG. 9(b) is a perspective view showing the upper seal 81 and the lower seal 82 before connection. A rod-shaped insertion portion 85 is provided at a bottom part of the upper seal 81 and is connected to the lower seal 82 so as to be inserted into the lower seal 82. By the above connection, sealing surfaces include two surfaces 83 and 84 and the sealing property of the electrophoretic medium 56 can be improved. Further, the sealing surfaces of the upper seal 81 and the lower seal 82 both have a multistage structure of the concave portion 71 and the convex portion 72 as shown in FIGS. 7(a) and 7(b). By doing so, even when the sealing surface 83 of the upper seal 81 is scratched or chipped and the electrophoretic medium 56 leaks downward, the lower seal 82 can prevent the electrophoretic medium 56 from leaking outside the electrophoretic medium container 2. Further, by providing a distance between the sealing surface 83 of the upper seal 81 and the sealing surface 84 of the lower seal 82 by the insertion portion 85, it is possible to confine a larger amount of the electrophoretic medium when the electrophoretic medium 56 is leaked and further prevent the leakage. Additionally, when the lower seal 82 is pushed by the plunger 32 by a portion that is not the center of the lower seal 82, which is one-side contact, although the lower seal 82 is slanted, the upper seal 81 which is at a distance from the bottom part of the lower seal 82 pushed by the plunger 32 is less affected by the moment balance due to the insertion portion 85 and the sealing property is maintained. In the first embodiment, two sealing components are connected, and three or more sealing components may be connected. In this case, for example, a plurality of upper seals 81 are provided and the lower seal 82 is provided at the lowermost part.

The above-described embodiments may be combined. As described above, according to the invention, the sealing surface is closely adhered to the inner wall of the container syringe part, and the sealing property can be ensured. In addition, by bringing only the sealing surface into contact with the inner wall of the syringe part, it is possible to prevent a change in the generated pressure in the electrophoretic medium liquid delivery. As a result, it is possible to manage the amount of liquid delivery supplied to the capillary of the electrophoretic medium with a fine solution and to reduce the running cost.

REFERENCE SIGN LIST 1 capillary array
2 electrophoretic medium container
3 anode-side buffer solution container
4 cathode-side buffer solution container
5 sample container
6 liquid delivery mechanism
7 sampler base
8 Y driver
9 Z driver
10 X driver
11 sample tray
12 thermostatic chamber unit
13 electrode
14 thermostatic chamber door
15 irradiation detection unit
16 autosampler unit
17 irradiation detection/thermostatic chamber unit
21 anode-side cleaning tank
22 anode-side electrophoretic buffer solution tank
23 anode-side sample introduction buffer solution tank
24 waste liquid tank
25 cathode-side cleaning tank
25 cathode-side electrophoretic buffer solution tank
31 guide
32 plunger
41 capillary
42 detection unit
43 capillary head
44 capillary head boss
45 capillary head tip
46 load header
47 SUS pipe
51 syringe part
52 sealing component
53 rubber plug
54 cap
55 film
56 electrophoretic medium
57 air 58 sealing surface
59 sealing bottom
60 groove
61 body part
62 body part sealing surface
71 concave portion
72 convex portion
81 upper seal
82 lower seal
83 upper sealing surface
84 lower sealing surface
85 insertion portion
91 driving screw
92 slider
93 nut
94 torque limiter outer ring preventing member
95 torque limiter outer ring
96 torque limiter inner ring
97 parallel pin
98 linear guide
99 detection plate
100 origin sensor
101 liquid delivery mechanism base
102 stepping motor
103 rotary encoder
104 torque limiter

The invention claimed is:

1. An electrophoretic medium container comprising:
a syringe part that holds an electrophoretic medium; and
a first sealing component that seals one end of the syringe part, wherein
the first sealing component is opened on an upper side and has a U-shaped cross section, and
the first sealing component comprises:
a first sealing surface;
a first body part; and
a first groove provided between the first sealing surface and the first body part, in which the first sealing surface is in contact with an inner wall of the syringe part;
a second sealing component connected in the vertical direction with the first sealing component, wherein
the second sealing component is opened on an upper side and has a U-shaped cross section, and
the second sealing component comprises:
a second sealing surface;
a second body part; and
a second groove provided between the second sealing surface and the second body part in which the second sealing surface is in contact with the inner wall of the syringe part, wherein
an outer diameter of the first or second sealing surface is larger than an outer diameter of another portion of the sealing component and larger than an inner diameter of the syringe part.

2. The electrophoretic medium container according to claim 1, wherein
the first or second sealing surface has a concave-convex multistage structure along the vertical direction.

3. The electrophoretic medium container according to claim 2, wherein
a convex portion of the multistage structure of the first or second sealing surface narrows toward a tip end.

4. The electrophoretic medium container according to claim 1, wherein
at least one third sealing surface is provided at an uppermost portion of the first or second sealing component.

5. The electrophoretic medium container according to claim 1, wherein
the first or second sealing surface has a flat surface or a curved surface.

6. The electrophoretic medium container according to claim 1, wherein
the first or second sealing component has a larger expansion coefficient than the syringe part.

7. The electrophoretic medium container according to claim 1, wherein
the first and second sealing components are connected by a rod-shaped insertion portion.

8. An electrophoretic medium container comprising:
a syringe part; and
a first sealing component that seals one end of the syringe part, wherein
the first sealing component is opened on an upper side and has a U-shaped cross section, and
the first sealing component comprises:
a first sealing surface;
a first body part; and
a first groove provided between the first sealing surface and the first body part, in which the first sealing surface is in contact with an inner wall of the syringe part;
a second sealing component connected in the vertical direction with the first sealing component, wherein
the second sealing component is opened on an upper side and has a U-shaped cross section, and
the second sealing component comprises:
a second sealing surface;
a second body part; and
a second groove provided between the second sealing surface and the second body part, in which the second sealing surface is in contact with the inner wall of the syringe part.

9. The electrophoretic medium container according to claim 8, wherein
the first or second sealing surface has a concave-convex multistage structure along the vertical direction.

10. The electrophoretic medium container according to claim 9, wherein
a convex portion of the multistage structure of the first or second sealing surface narrows toward a tip end.

11. The electrophoretic medium container according to claim 8, wherein
at least one third sealing surface is provided at an uppermost portion of the first or second sealing component.

12. The electrophoretic medium container according to claim 8, wherein
the first or second sealing surface has a flat surface or a curved surface.

13. The electrophoretic medium container according to claim 8, wherein
the first or second sealing component has a larger expansion coefficient than the syringe part.

14. The electrophoretic medium container according to claim 8, wherein
the first and second sealing components are connected by a rod-shaped insertion portion.

* * * * *